May 23, 1950 L. F. POLK 2,508,797
PROJECTING, MEASURING, AND GAUGING DEVICE
Filed Dec. 3, 1948

INVENTOR.
Louis F. Polk
BY Edward J. Noe Jr.
atty

Patented May 23, 1950

2,508,797

UNITED STATES PATENT OFFICE 2,508,797

PROJECTING, MEASURING, AND GAUGING DEVICE

Louis F. Polk, Dayton, Ohio, assignor to The Sheffield Corporation, Dayton, Ohio, a corporation of Ohio Application December 3, 1948, Serial No. 63,299

3 Claims. (Cl. 88—24)

This invention relates to measuring instruments and more particularly to dimension measuring instruments in which a dimension is measured by means of fluid leakage taking place between the object or work and a work head.

One object of the invention is the provision of a dimension measuring instrument of the character mentioned including an optical system having a scale on which indications are produced in accordance with the position of a member operated by a fluid pressure responsive device which in turn is controlled in accordance with the fluid leakage taking place between the object and the work head, the entire device working without friction due to the elimination of articulated connections and measuring the dimension of the work or object without physical contact with the object.

Another object of the invention is the provision of a dimension measuring instrument having a pressure responsive tube which flexes in accordance with the pressure supplied to the tube, such pressure being governed by the amount of leakage taking place at the work, the pressure responsive tube being fixed to a target arm operable in the path of a light beam so that an actual indication of the size or dimension is precisely measured on an indicating scale visible to the operator.

Figure 1:
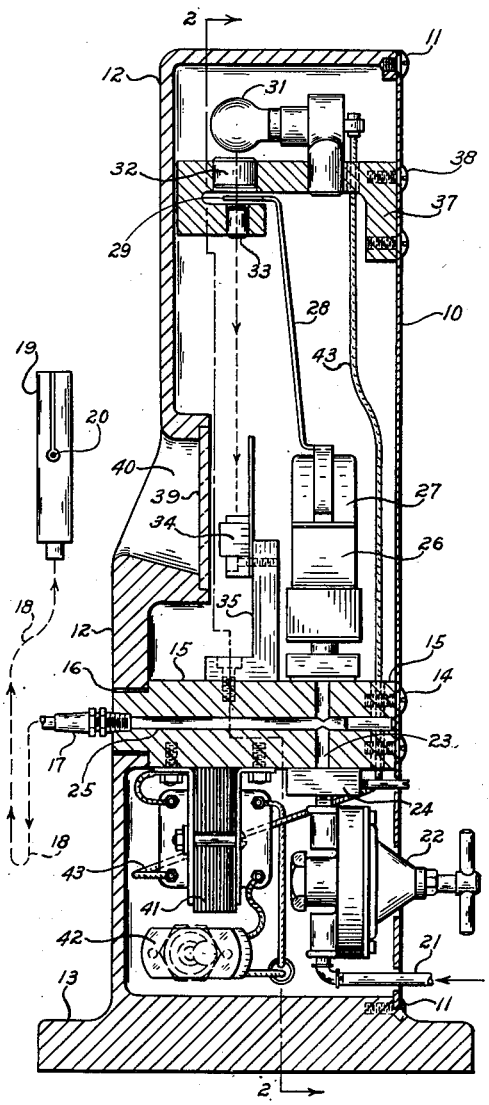
Figure 2:
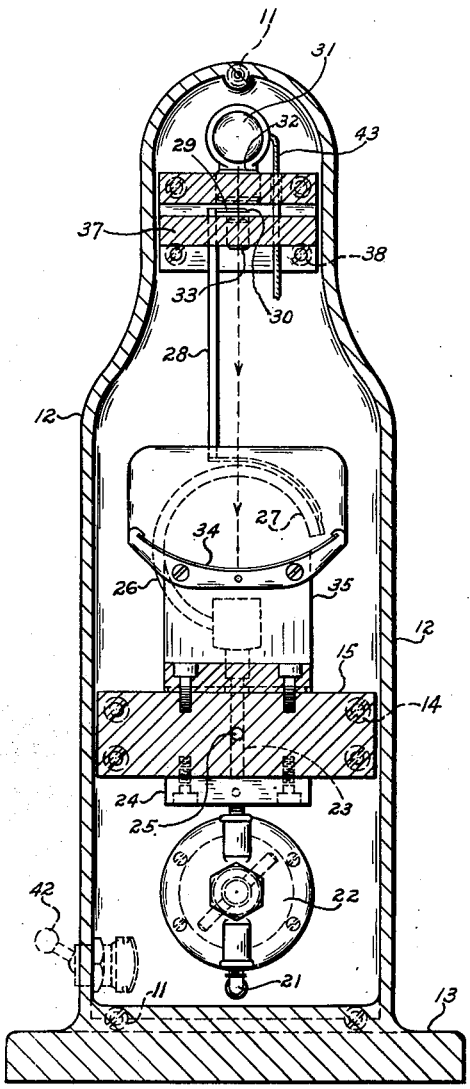

Other objects and advantages of the invention will be apparent from the following description, the appended claims and the accompanying drawing, in which Fig. 1 is a vertical sectional view taken centrally through a measuring instrument embodying the present invention; and Fig. 2 is a vertical section on the line 2—2 of Fig. 1.

Referring more particularly to the drawing in which the same reference numerals have been applied to like parts in the different views, the dimension measuring instrument of the present invention embodies a housing formed by an upstanding back plate 10 fixed by means of screws 11 to a front cover 12 which also forms a base portion 13. Fixed on the back plate by means of screws 14 is a bracket 15 the forward portion of which extends through a hole 16 in the cover 12, where it is attached by means of a coupling 17 to a flexible tube 18 leading to a work engaging head 19 adapted for telescopic interengagement with the work. As shown, the head 19 is a plug or spindle adapted to measure the inside diameter of a hole in an object or workpiece, although it will be obvious that the shape and size of the work head 19 is determined by the particular object to be gauged.

The work head 19 is provided with a pair of diametrically opposed gauging orifices 20 through which air or other fluid supplied under pressure through the tube 18 flows, the amount of the flow being dependent upon the clearance between the outer surface of the gauging orifices and the workpiece surface gauged. In pneumatic gauges of this character, there is no physical contact between the work and the gauging orifices and the dimension may be gauged, therefore, with no possibility of marring or scratching the workpiece.

Air under pressure is supplied through a pipe 21 to a pressure regulating valve 22 carried by the bracket 15. The pressure controlled fluid then flows through a manually adjustable restrictor valve 24 into a passage 23 in the bracket, the valve 24 producing a drop in pressure so the pressure of the air or other fluid in the passage 25 is dependent upon the amount of leakage taking place at the workpiece.

The bracket 15 also carries a flexible pressure responsive curved hollow tube 26 which is subjected to the pressure existing in the passage 25. The free end 27 of this tube 26 is fixed to an arm 28. When no pressure is applied to the inside of the hollow tube 26, the arm 28 is positioned as indicated at Fig. 2, but when the tube is subjected to pressure, as under operating conditions, the free end of the tube, to a small degree, has an unwinding movement, thus swinging the arm counter-clockwise as viewed in that figure to an extent dependent upon the pressure in the tube which in turn is dependent upon the amount of leakage taking place at the work.

The upper end of the arm 28 carries a target portion 29 having a light intercepting edge 30. This target portion is arranged in the path of a light beam that travels from a lamp 31 through condensing lens 32 and an objective lens 33 to a measuring scale 34 held on a supporting plate 35 which is carried by bracket 15. The lamp and lens system are carried by an upper bracket 37 fixed by means of screws 38 on the back plate 10. When the target is positioned as shown, it intercepts light to the measuring scale leaving the scale in shadow, but under operating conditions the edge 30 permits illumination of a part of the scale and projects an image of the edge 30 on the scale giving a sharp shadow line or indication of the actual measurement of the workpiece. The scale is visible through a glass 39 arranged in an opening 40 through which the operator can inspect the measuring scale.

Lamp 31 is energized through lead wire 43 extending to a transformer 41 carried by bracket 15 and connected to an on-and-off switch 42.

The edge 30 of the target portion does not move precisely concentric with the center of curvature of the tube 26 as the target track is slightly curved. However, it is unimportant that the target member move in a plane or move in a curved path and a movement generally from right to left or vice versa, as viewed in Fig. 2, is all that is required for proper operation.

It will be obvious that in the entire system, from the workpiece through the fluid pressure system and through the optical system which translates the results of the optical system into an actual physical measurement, there are no sliding joints or pivots. Both the optical and the fluid pressure parts operate without friction and, consequently, without error caused by wear. Extremely accurate and precise measurements can thus be obtained to determine the actual size of the diameter or other dimension checked due to the high amplification factor of the instrument and this is accomplished, as already mentioned, without requiring the application of physical pressure on the workpiece.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A measuring instrument of the character described comprising a support, a measuring scale and a light source mounted on said support, a lens system for projecting a light beam from the source to the scale, a movable member having a target portion interposed in the path of the light beam between the scale and the light source and producing an indication on the scale in accordance with the position of said member, a flexible pressure-responsive element on said support said element having a portion movable in response to changes in pressure of said element, said portion having a connection to said member to position the member in accordance with the pressure applied to the element and connections from said element to a fluid pressure supply and to a gauging head in which fluid leakage takes place between the gauging head and the workpiece to vary the pressure applied to the element.

2. A measuring instrument of the character described comprising a support, a measuring scale and a light source mounted on said support, a lens system for projecting a light beam from the source to the scale, an arm having a target portion interposed in the path of the light beam between the scale and the light source and producing an indication on the scale in accordance with the position of said arm, a flexible pressure-responsive tube on said support said tube having a movable end fixed to said arm to position the target portion in accordance with the pressure applied to the tube, and means for connecting said tube to a fluid pressure supply and to a gauging head in which fluid leakage takes place between the gauging head and the workpiece to vary the pressure applied to the tube.

3. A measuring instrument of the character described comprising an upright supporting plate, a measuring scale and a light source mounted on said plate, a lens system on said plate for projecting light beams from the source to the scale, a movable member having a target portion interposed in the path of the light beam between the scale and the light source and producing an indication on the scale in accordance with the position of said member, a flexible pressure-responsive tube on said plate, said tube having a connection to said member to position the member in accordance with the pressure applied to the tube, means on said plate for supplying fluid under pressure to said tube, a gauging head in which fluid leakage takes place between the gauging head and a workpiece to vary the pressure applied to the tube, a front cover supported by said plate and having an opening through which said scale is visible, and a connection from said gauging head to said tube extending through said front cover.

LOUIS F. POLK.

REFERENCES CITED

The following references are of record in the file of this patent:

UNITED STATES PATENTS

| Number | Name | Date |
|---|---|---|
| 1,623,276 | Schaper | Apr. 5, 1927 |
| 1,660,679 | Marshall | Feb. 28, 1928 |
| 1,740,130 | Von Voss et al. | Dec. 17, 1929 |
| 2,068,390 | Sullivan | Jan. 19, 1937 |
| 2,388,912 | Haferl et al. | Nov. 13, 1945 |